United States Patent [19]
Stovall

[11] Patent Number: 5,681,350
[45] Date of Patent: Oct. 28, 1997

[54] PROSTHESIS FOR HOOF WALL

[76] Inventor: Thomas J. Stovall, 21323 Park Green Dr., Katy, Tex. 77450

[21] Appl. No.: 584,623

[22] Filed: Jan. 11, 1996

[51] Int. Cl.⁶ ..................................................... A01L 15/00
[52] U.S. Cl. ................................ 606/212; 168/DIG. 1
[58] Field of Search ................................ 168/4, 14, 28, 168/DIG. 1; 606/212

[56] References Cited

U.S. PATENT DOCUMENTS

| | | | |
|---|---|---|---|
| 4,182,340 | 1/1980 | Spencer | 606/212 |
| 4,237,981 | 12/1980 | Stubbe | 168/4 |
| 4,896,727 | 1/1990 | Busser | 168/4 |
| 5,199,498 | 4/1993 | Knudsen | 168/28 |

FOREIGN PATENT DOCUMENTS 235072  4/1986  Germany ................................ 168/4

Primary Examiner—Robert P. Swiatek
Attorney, Agent, or Firm—Bush, Riddle & Jackson, LLP

[57] ABSTRACT

A rigid and permeable prosthesis that fills the debrided portion of the wall of a horse's hoof having white line disease or the like includes a mass of particulate material with individual particles coated with a resin so as to cleave to one another at all contact areas and transfer weight, while leaving interconnected pore spaces that allow air and liquid medications to reach the diseased area during the healing process.

5 Claims, 1 Drawing Sheet

PROSTHESIS FOR HOOF WALL

FIELD OF THE INVENTION

This invention relates generally to a method and means for replacing and/or repairing the hoof of an animal such as a horse, and particularly to an air and liquid permeable prosthesis which replaces the hoof wall which has been traumatically removed or therapeutically debrided while simultaneously supporting a portion of the weight of the animal and allowing oxygen and medication to reach the affected structures of the foot.

BACKGROUND OF THE INVENTION

The hoof wall of a horse is composed of keratinized epithelial cells. It is a cornified epidermis and is composed of three layers: stratum externum, stratum medium and stratum internum. The hoof wall is the most important weight-bearing structure of the foot. When the integrity of the hoof wall is compromised by trauma or by any of several pathological conditions such as white line disease (fungal onychomycosis) which attacks the stratum medium, or other infections affecting those structures proximal to the hoof wall, the ability of the foot to carry its normal share of the horse's weight is greatly decreased. The horse may become lame, and an avenue of entrance is established for other pathogenic organisms which may attack the inner structures of the foot.

In order to treat injuries and diseases within and close to the hoof wall, all of the affected material is often debrided. Additionally, since many of the pathogens which attack the hoof wall are anaerobic, aerobic conditions must often be established and maintained and the affected areas medicated. However, this creates a problem. If an extensive amount of hoof wall must be debrided, the remaining wall may not offer sufficient support. Additionally, because many of the pathogens which attack both the wall and those structures close to the wall are anaerobic, it is often desirable to establish and maintain aerobic conditions at the affected area. But since the need to support the animal is more important than the maintenance of aerobic conditions at the affected area, the affected area is usually filled with some form of polymeric prosthesis. This allows the horse to support its weight in a normal manner, however since all polymeric prosthetic materials known to the applicant are air and liquid-impermeable, the prosthesis forms an impenetrable barrier to topical medication and creates anaerobic conditions under which many pathogens grow and proliferate.

A general object of the present invention is to provide a new and improved form of polymeric hoof wall replacement material which will form an air and liquid permeable prosthesis. When used as a hoof wall replacement, this invention is the only material which will support the weight of the horse in a normal manner while allowing those topical medications often used in the treatment of various pathologies affecting the hoof wall and those areas close to the wall to reach the affected area without removing the prosthesis. For example, by using this invention, the merthiolate or benzoyl peroxide solutions sometimes used to treat white line disease can pass through the prosthesis to the affected area. At present, the only way to topically medicate those structures proximal to a prosthesis is to remove the prosthesis.

Another object of the invention is to provide a prosthesis which will allow aerobic conditions to exist near the prosthesis. The unique structure of this invention allows the prosthesis to support the weight of the horse while at the same time allowing the passage of oxygen through the prosthesis. This invention is believed to be the only hoof wall replacement material which allows aerobic conditions to exist proximal to the prosthesis.

SUMMARY OF THE INVENTION

These and other objects are attained in accordance with this invention through provision of a hoof repair material which provides a prosthesis for that region of hoof wall which has been removed by accident or design. The hoof repair material is formed by coating regularly or irregularly shaped particulate matter with a catalytic-hardening polymeric resin in such a manner that the particles are uniformly coated and stick together at surfaces where they touch. Depending upon choice of resin, the coating can be catalyzed by chemical catalyst before mixing or after mixing by ultraviolet light. Once cured, the material is effectively a solid from the standpoint of weight transference, yet effectively permeable due to interconnected void spaces between the coated particles so that the resulting prosthesis is open-celled to allow the passage of oxygen and liquids to those structures close to the prosthesis. Because of this unique construction, the anaerobic conditions which foster the growth of various pathogens are avoided in accordance with this invention, and liquid topical medications can be applied by allowing them to soak directly through the prosthesis to the affected areas.

BRIEF DESCRIPTION OF THE DRAWINGS

The present invention has the above as well as other objects, features and advantages which will become clearly apparent in connection with the following detailed description of a preferred embodiment or embodiments, taken in conjunction with the appended drawings in which.

DETAILED DESCRIPTIONS OF PREFERRED EMBODIMENTS

Figure 1:
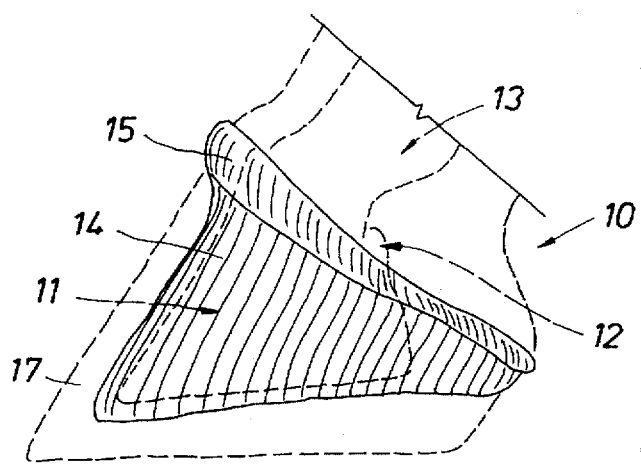
FIG. 1 is a side view of selected portions of the corium of the equine foot.

Referring initially to FIG. 1., the foot 10 of a horse has a skeletal structure, shown by interior dotted lines, that includes the coffin bone 11 (3rd phalanx), the navicular bone 12 (distal sesamoid), and the shod pastern 13 (2nd phalanx). The laminar corium 14, which grows out of the coronary corium 15, surrounds the coffin bone 11 and has dermal laminae as shown that intermesh with the epidermal laminae of the hoof wall 17 to transfer weight of the horse to the coffin bone 11 and the shod pastern 13. The outer wall surface of the hoof wall 17 also is shown in phantom lines. Anatomically, the hoof wall 17 is analogous to the claws of a cat or the finger and toe nails of man. If the structural integrity of the hoof wall 17 is significantly compromised by injury or disease, the horse may become lame and unable to perform even the most rudimentary activities until such time as the wall again is able to bear its normal share of the weight of the horse. Through use of the present invention, structural integrity of the hoof wall can be quickly re-established within normal parameters for those horses having a hoof wall that has been significantly compromised by injury, or debridement necessitated by disease located close to its inner wall surface such as white line disease or an abscess. At the same time, aerobic conditions are maintained so that liquid medications can reach the affected area without removal of the prosthesis.

Figure 2:
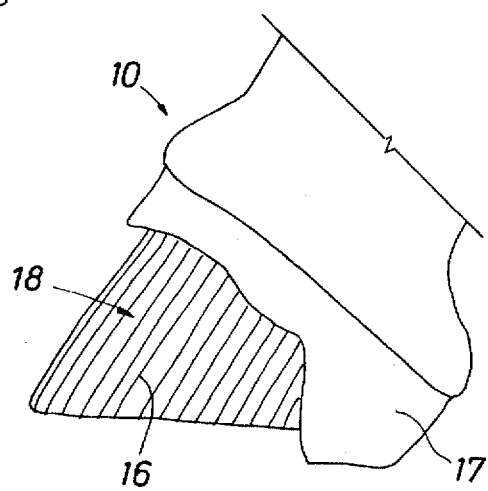
FIG. 2 is a side view of the foot showing a typical dorsal-lateral debridement with the dermal laminae of the coffin bone exposed.

FIG. 2 illustrated generally at 18 a significant debridement of hoof wall 17 to treat a disease that may require daily medication and/or aerobic conditions at the affected area. The use of this invention will allow the animal to be returned to use as quickly as a prosthesis can be safely installed, instead of waiting six to eight months while the hoof grows out, for the horse to be returned to use. It will be recognized that if a horse has the structural integrity of two or more hooves compromised by traumatic removal or debridement due to pathology, and long-term post-operative medication of the affected area is required, the animal sometimes is euthanized due to the inherent difficult of treating an animal which cannot support itself. Of course a horse cannot support itself on two legs except for very short periods; neither can it maintain a state of lateral recumbency for extended periods. In the case of multiple hoof involvement of the horse, this invention will allow the walls of more than one foot to be debrided, even though daily medication or the maintenance of aerobic conditions at the affected areas is required.

To carry out this invention, the hoof wall portion 18 is debrided as shown in FIG. 2, usually with some sort of router or the like, and the underlying dermal laminae 16 cleaned and medicated. When the debridement is extensive as shown, the horse will be unable to bear weight on that foot. Use of the horse after extensive debridement without replacing the removed hoof wall with a prosthesis can result in traumatic separation of the laminae and possible separation of the phalanges 11, 13 from the hoof wall 17.

Figure 3:
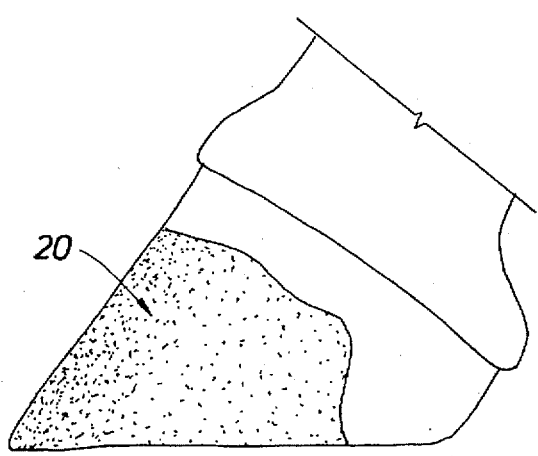
FIG. 3 is a side view similar to FIG. 4., but with the prosthesis of the present invention used to replace the debrided hoof wall.
Figure 4:
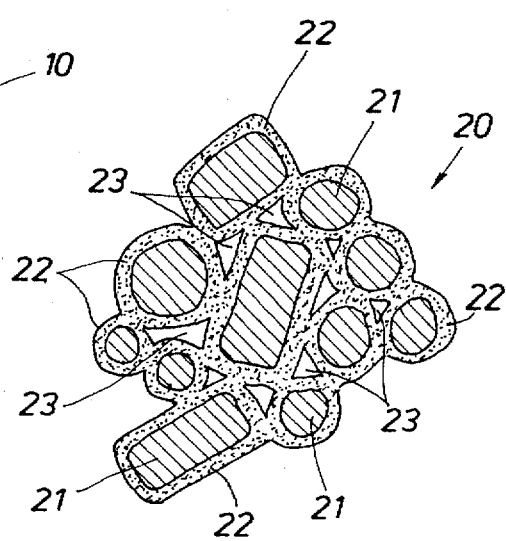
FIG. 4 is a greatly enlarged, schematic fragmentary view of the prosthesis material of the invention formed by particulate matter coated with a catalytic-hardening polymeric resin.

To form the prosthesis 20 as shown in FIG. 3, regularly or irregularly shaped solid particulate matter such as sand, seeds, glass, plastic or metal particles, or equivalent substances that are rigid, coatable and insoluble in the solvents used in the particular polymeric resin selected for use are coated with a catalytic-hardening polymeric resin of such viscosity that the resin adheres to the particulate material. In the representative example, the coating can be an epoxy that is mixed with a suitable catalyst, after which the particles are uniformly and thoroughly coated with the catalyzed epoxy. The resultant mixture has a viscosity similar to wet modeling clay and is placed into the void created by the removed region 18 and sculpted on the outside to the shape of the hoof wall by means of a trowel or gloved hand. Typically, the prosthesis 20 becomes hard enough to bear weight in about 15 minutes and cures completely within about 24 hours. After the material 20 hardens, it can be sanded or rasped to the original shape of the hoof as shown. The polymeric resin used to form the invention can be any catalytic-hardening resin (e.g., epoxy, polyester, acrylic, isocyanate, etc.) of suitable viscosity which is capable of providing coatings 22 on the particles 21, as shown in FIG. 4, so that adjacent particles stick to one another to form a porous body.

Once the prosthesis 20 cures, it is able to support the horse's weight in a normal manner and the animal is able to resume activities consistent with the prognosis associated with the original trauma or pathology. As shown in FIG. 4, the interconnected pore spaces 23 of the prosthesis 20 allows oxygen to reach the affected area and precludes the growth of anaerobic organisms. Additionally, the interconnected pore spaces 23 allow liquid topical medications to permeate the prosthesis 20 and reach the affected areas.

The present invention has enormous advantages over prior prosthesis which are closed-celled and thus air and moisture impermeable. The animal treated as disclosed herein is not lame during healing because the new and improved prosthesis 20 will support weight with the weight being distributed as by a normal hoof.

Since certain changes and modifications may be made in the disclosed embodiments without departing from the inventive concepts involved, it is the aim of the appended claims to cover all such changes and modifications falling within the free spirit scope of the present invention.

What is claimed is:

1. A prosthesis for use in filling a region of the hoof of an animal which has been removed by trauma or debridement to enable treatment of a disease of the hoof wall or areas close to said wall comprising: a mass of particulate material having solid individual particles coated with a catalytic-hardening polymeric resin so as to adhere to one another where the coatings touch, while leaving interconnected pore spaces through which air and liquids can pass, said mass being formed to substantially fill said region before the resin polymerizes and provide an air and liquid-permeable, weight-bearing, prosthesis body.

2. The prosthesis of claim 1 wherein said particulate material is selected from a group comprising sand grains, seeds, glass, plastic or metal particles.

3. A method of forming a prosthesis on the hoof of an animal where a portion of the hoof wall has been removed by trauma or debridement necessitated by disease in or close to the wall of the hoof, comprising the steps of filling the space left by the removed portion of the wall with a permeable mass of particulate material having individual solid particles coated with a catalytic-hardening polymeric resin which adhere at contact points; and allowing the mass to harden in order to support the animal's weight while leaving interconnected pore spaces through which air and liquids can pass to the diseased area.

4. The method of claim 3 including the further step of applying medication to those areas behind to the prosthesis by causing said medications to soak through said material and into contact with said areas.

5. The method of claim 3 including the further step of shaping external surfaces of said mass so as to form substantially the original shape of said removed hoof portion.

* * * * *